United States Patent
Doti et al.

(10) Patent No.: US 11,699,352 B2
(45) Date of Patent: Jul. 11, 2023

(54) IMPLEMENTING AN ACHIEVEMENT PLATFORM USING A DATABASE SYSTEM

(71) Applicant: Salesforce, Inc., San Francisco, CA (US)

(72) Inventors: Adam Mccormick Doti, Petaluma, CA (US); Cameron Reynolds-Flatt, San Francisco, CA (US); Samantha Ready, San Francisco, CA (US); Adam Torman, Walnut Creek, CA (US)

(73) Assignee: Salesforce, Inc., San Francisco, CA (US)

( * ) Notice: Subject to any disclaimer, the term of this patent is extended or adjusted under 35 U.S.C. 154(b) by 840 days.

(21) Appl. No.: 16/220,354

(22) Filed: Dec. 14, 2018

(65) Prior Publication Data

US 2020/0098278 A1 Mar. 26, 2020

Related U.S. Application Data

(60) Provisional application No. 62/735,321, filed on Sep. 24, 2018.

(51) Int. Cl.
*A63F 13/216* (2014.01)
*G06F 16/25* (2019.01)
(Continued)

(52) U.S. Cl.
CPC .............. *G09B 5/00* (2013.01); *A63F 13/216* (2014.09); *G06F 3/0482* (2013.01); *G06F 8/34* (2013.01);
(Continued)

(58) Field of Classification Search
CPC .. G09B 5/00; G09B 5/02; G09B 5/065; G06F 3/0482; G06F 8/34; G06F 16/252;
(Continued)

(56) References Cited

U.S. PATENT DOCUMENTS 6,292,792 B1 9/2001 Baffes et al.
8,341,529 B1 12/2012 Li et al.
(Continued)

FOREIGN PATENT DOCUMENTS

EP 3229151 A1 10/2017
WO 2018064375 A1 4/2018

OTHER PUBLICATIONS

U.S. Appl. No. 29/678,006, Notice of Allowance and Fees Due (Ptol-85), dated Jul. 9, 2020, 13 pgs.
(Continued)

*Primary Examiner* — Justin R. Blaufeld
(74) *Attorney, Agent, or Firm* — Kwan & Olynick LLP

(57) ABSTRACT

An achievement platform may be maintained using a database system. A user interface may be displayed on a device of an authorized user of the achievement platform. The user interface may be configurable to allow the authorized user to create or modify customizable awards that are achievable based on customizable logic definable by the authorized user. The authorized user may be affiliated with a first one of a plurality of organizations implementing an application or service. Input, to create a first award based on first customizable logic, may be processed. The first customizable logic may be configured by the authorized user such that satisfaction of conditions causes designated users associated with the application or service to be presented with the first award. It may be determined that a first user affiliated with the first organization has satisfied the conditions. The first user may be presented with the first award.

20 Claims, 11 Drawing Sheets

(51) Int. Cl.
| | |
|---|---|
| *G06F 21/62* | (2013.01) |
| *G06F 3/0482* | (2013.01) |
| *G06F 8/34* | (2018.01) |
| *G06Q 10/0639* | (2023.01) |
| *G09B 5/00* | (2006.01) |
| *G09B 5/02* | (2006.01) |
| *G09B 5/06* | (2006.01) |
| *G06F 21/31* | (2013.01) |

(52) U.S. Cl.
CPC .......... *G06F 16/252* (2019.01); *G06F 21/629* (2013.01); *G06Q 10/06398* (2013.01); *G09B 5/02* (2013.01); *G09B 5/065* (2013.01); *A63F 2300/5586* (2013.01); *A63F 2300/69* (2013.01); *G06F 21/31* (2013.01); *Y10S 715/967* (2013.01)

(58) Field of Classification Search
CPC . G06F 21/629; G06F 21/31; G06Q 10/06398; A63F 13/46; A63F 13/216; A63F 2300/5586; A63F 2300/69; Y10S 715/967
See application file for complete search history.

(56) References Cited

U.S. PATENT DOCUMENTS

| | | | |
|---|---|---|---|
| 8,973,106 B2 | 3/2015 | Warshavsky et al. | |
| D726,754 S | 4/2015 | Angelides | |
| D743,986 S | 11/2015 | Pan et al. | |
| 9,195,438 B2 | 11/2015 | Toens et al. | |
| 9,268,955 B2 | 2/2016 | Wu et al. | |
| D752,072 S | 3/2016 | Song | |
| D753,703 S | 4/2016 | Villamor et al. | |
| D755,215 S | 5/2016 | Lee et al. | |
| 9,417,840 B2 | 8/2016 | Pradeep et al. | |
| 9,600,155 B2 | 3/2017 | Hale et al. | |
| 9,628,493 B2 | 4/2017 | Warshavsky et al. | |
| 9,632,849 B2 | 4/2017 | Pradeep et al. | |
| 9,658,801 B2 | 5/2017 | Pradeep et al. | |
| 9,669,296 B1 * | 6/2017 | Hibbert | A63F 13/5378 |
| 9,710,127 B2 | 7/2017 | Torman et al. | |
| 9,767,022 B2 | 9/2017 | Pradeep et al. | |
| 9,767,040 B2 | 9/2017 | Pradeep et al. | |
| 10,037,233 B2 | 7/2018 | Pradeep et al. | |
| 10,049,131 B2 | 8/2018 | Torman et al. | |
| D828,394 S | 9/2018 | Li et al. | |
| D870,145 S | 12/2019 | Christian | |
| D877,163 S | 3/2020 | Tekamp et al. | |
| D877,775 S | 3/2020 | Alamin | |
| D879,833 S | 3/2020 | Klein et al. | |
| D882,583 S | 4/2020 | Dattilo-Green et al. | |
| D894,213 S | 8/2020 | Doti et al. | |
| 2002/0046109 A1 | 4/2002 | Leonard et al. | |
| 2003/0022657 A1 | 1/2003 | Herschberg et al. | |
| 2007/0067441 A1 | 3/2007 | Pomerantz | |
| 2007/0162524 A1 | 7/2007 | Coe et al. | |
| 2010/0153566 A1 | 6/2010 | Sheleheda et al. | |
| 2013/0291065 A1 * | 10/2013 | Jakowski | G06Q 10/06398 726/4 |
| 2013/0337909 A1 * | 12/2013 | Pattison | A63F 13/65 463/29 |
| 2014/0081714 A1 * | 3/2014 | Debow | G06Q 10/06398 705/7.42 |
| 2014/0205990 A1 | 7/2014 | Wellman et al. | |
| 2014/0274413 A1 * | 9/2014 | Chelst | A63F 13/847 463/42 |
| 2015/0106736 A1 | 4/2015 | Torman et al. | |
| 2015/0127670 A1 | 5/2015 | Torman et al. | |
| 2015/0134700 A1 | 5/2015 | Macklem et al. | |
| 2016/0041976 A1 | 2/2016 | Pradeep et al. | |
| 2016/0063270 A1 | 3/2016 | Brock et al. | |
| 2016/0078120 A1 | 3/2016 | Pradeep et al. | |
| 2016/0080461 A1 | 3/2016 | Pradeep et al. | |
| 2017/0075922 A1 | 3/2017 | Torman et al. | |
| 2017/0076012 A1 | 3/2017 | Sreenivasa et al. | |
| 2017/0189814 A1 * | 7/2017 | Ventrice | A63F 13/79 |
| 2017/0293632 A1 | 10/2017 | Pradeep et al. | |
| 2017/0296919 A1 * | 10/2017 | Margiotta | A63F 13/46 |
| 2018/0025113 A1 | 1/2018 | Torman et al. | |
| 2018/0095613 A1 | 4/2018 | Ready et al. | |
| 2018/0095733 A1 | 4/2018 | Torman et al. | |
| 2018/0095790 A1 | 4/2018 | Pradeep et al. | |
| 2018/0096012 A1 | 4/2018 | Warshavsky et al. | |
| 2018/0096013 A1 | 4/2018 | Warshavsky et al. | |
| 2018/0096020 A1 | 4/2018 | Sreenivasa et al. | |
| 2018/0096024 A1 | 4/2018 | Bitting et al. | |
| 2018/0096613 A1 | 4/2018 | Torman et al. | |
| 2018/0129359 A1 | 5/2018 | Torman et al. | |
| 2018/0225159 A1 | 8/2018 | Pradeep et al. | |
| 2018/0253195 A1 | 9/2018 | Van Osten et al. | |
| 2020/0097477 A1 | 3/2020 | Ryan | |
| 2020/0098275 A1 | 3/2020 | Doti | |

OTHER PUBLICATIONS

U.S. Appl. No. 16/207,588, Examiner Interview Summary dated Jul. 20, 2021, 3 pgs.

U.S. Appl. No. 16/207,588, Final Office Action dated Sep. 29, 2021, 31 pgs.

U.S. Appl. No. 16/207,588, Non-Final Office Action dated Apr. 15, 2021, 21 pgs.

* cited by examiner

| | | | | | | |
|---|---|---|---|---|---|---|
| SETUP Stamp Formulas | | | | | 308 | |
| 5 Results•Sorted by Last Updated | | | Quick Find | | New | Clone |
| Name | Formula | Visibility | Owner | Total earned | Enabled | |
| Lead Converter | Converts a lead | All users | Catherine Earnshaw | 0 | ✓ | ▼ |
| Opportunity Finder | Creates an opportunity | All users | Catherine Earnshaw | 0 | ✓ | ▼ |
| Pipeline Builder | Completes 4 activities | All users | Catherine Earnshaw | 0 | ✓ | ▼ |
| Lightning Igniter | Enables all features of Lightning | Administrator | Salesforce | 0 | ✓ | |
| Einstein Genius | Enables all features of Einstein | Administrator | Salesforce | 0 | ✓ | |

(rows labeled 304(a), 304(b), 304(c), 304(d), 304(e); figure 300)

Figure 3

IMPLEMENTING AN ACHIEVEMENT PLATFORM USING A DATABASE SYSTEM

CROSS-REFERENCE TO RELATED APPLICATIONS

This patent document claims priority to Provisional U.S. Patent Application No. 62/735,321 (A4138PROV_SFDCP005P) by Doti et al., titled "INTEGRATING AN APPLICATION OR SERVICE WITH A LEARNING PLATFORM USING A DATABASE SYSTEM", filed Sep. 24, 2018. Provisional U.S. Patent Application No. 62/735,321 is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to database systems and more specifically to maintaining an achievement platform using a database system.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

BRIEF DESCRIPTION OF THE DRAWINGS

The included drawings are for illustrative purposes and serve only to provide examples of possible structures and operations for the disclosed inventive systems, apparatus, methods and computer program products for implementing an achievement platform using a database system. These drawings in no way limit any changes in form and detail that may be made by one skilled in the art without departing from the spirit and scope of the disclosed implementations.

FIGS. 3-8 show examples of Graphical User Interfaces (GUIs), in accordance with some implementations.

DETAILED DESCRIPTION

Figure 1:
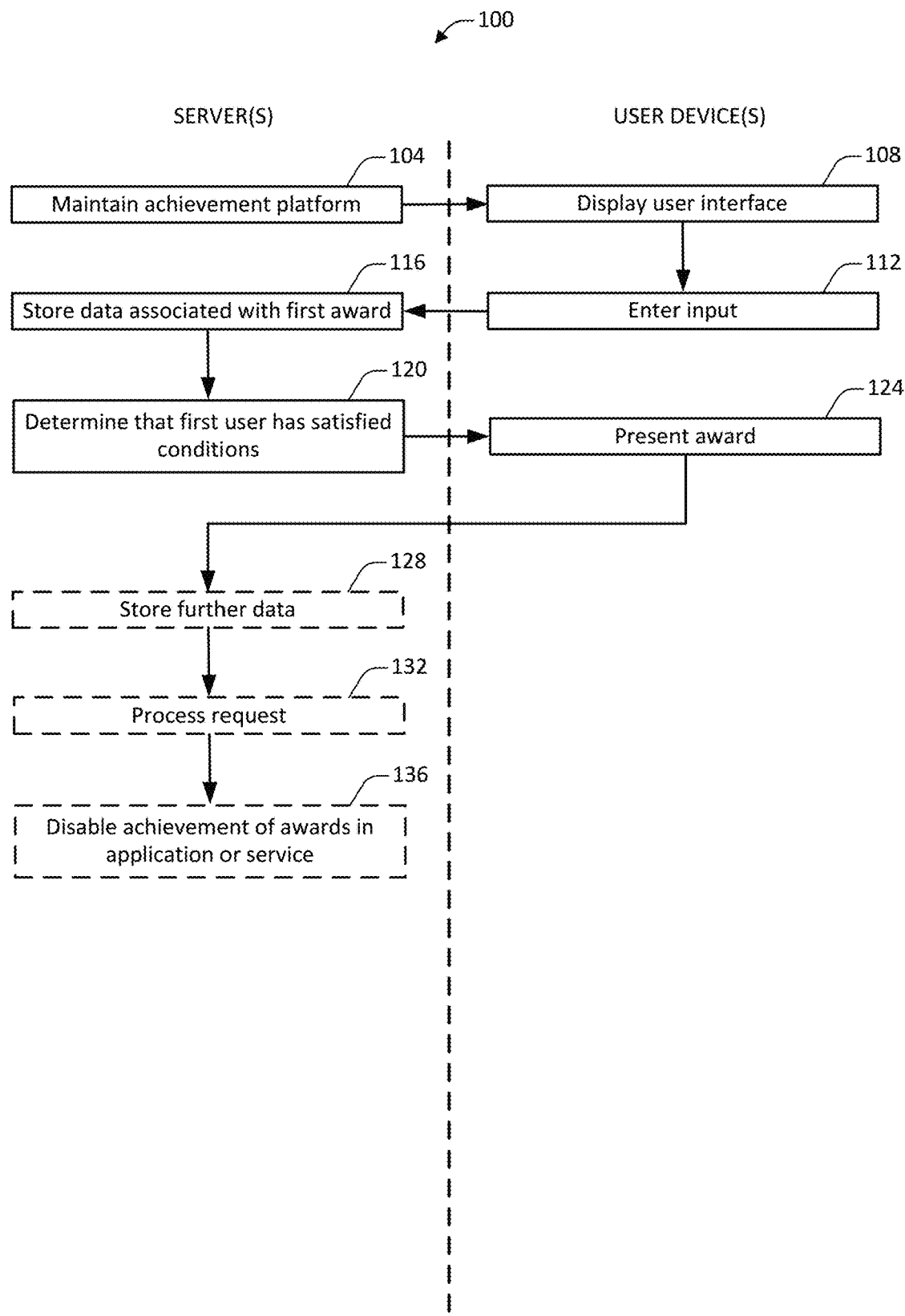
FIG. 1 shows a flowchart of an example of a method for implementing an achievement platform using a database system, performed in accordance with some implementations.

Some implementations of the disclosed systems, apparatus, methods and computer program products are configured for implementing an achievement platform using a database system. As described in further detail below, such an achievement platform may provide various types of incentivization by providing awards for a variety of conduct. By way of example, an achievement platform may provide awards for real-world tasks, engaging in interactive training exercises on a learning platform, and completing tasks in any type of application or service such as a Customer Relationship Management (CRM) Platform, a social networking system, any type of consumer or business software, etc. While CRM platforms are often discussed herein as an example of an application or service, one having skill in the art can appreciate that the examples of applications or services described herein may be substituted for any suitable application or service such as those described above.

Standard incentivization frameworks that may be included in some applications or services such as Microsoft® 365 gamification, often lack flexibility and customizability. Furthermore, incentivization strategies implemented by conventional learning platforms (e.g., Lynda® and Treehouse®) do not reward real-world interactions with the underlying subject matter being taught. By way of illustration, Cents and Sensibility, a multinational firm specializing in the provision of accounting services, is implementing a conventional CRM platform, Elinor, the Chief Executive Officer (CEO) of Cents and Sensibility, employs a conventional learning platform to teach Cents and Sensibility employees how to use the conventional CRM platform. Willoughby, a salesperson at Cents and Sensibility, diligently works to complete training exercises in his spare time while struggling to learn the new CRM platform. Unfortunately, Willoughby is not provided with awards for his achievements in his day-to-day interaction the CRM platform. Ultimately, this prevents Willoughby from living up to his full potential, and he fails to accomplish as many tasks in the CRM platform as he would have accomplished had he received adequate recognition of his achievements. Resultantly, Cents and Sensibility not only suffers from a missed opportunity to provide incentives to Willoughby for learning about new features of the CRM platform, but also fails to realize full productivity from its employees.

By contrast, some of the disclosed techniques can be used to implement an integrated reward system. By way of illustration, "stamps" may be a type of award provided to users for completing certain tasks in the CRM platform. In some implementations, awards such as stamps may be created and customized by authorized administrators. As such, returning to the above example, stamps can be provided to Willoughby as he uses various features in the CRM platform. As he earns more stamps, Willoughby becomes excited about learning, so he begins completing optional tasks in the learning platform attaining other types of awards such as "badges," "super badges," and "master badges." Each type of award is worth a certain amount of points, all of which total across the learning platform, the CRM platform, and other integrated applications or services, such as an enterprise social networking system. Willoughby wants to increase his point totals for his own personal enjoyment as well as to keep up with his peers. As a result, Willoughby increases his knowledge of the CRM platform through both hands-on experience and through the completion of training exercises.

In some implementations, an achievement platform may be used to incentivize and track accomplishments in a much wider variety of contexts than existing schemes. For example, the disclosed techniques may be used for real-world skill tracking and verification. By way of illustration, as described further below, Elinor may create an award that rewards a combination of advanced achievements in the CRM platform, extensive work in the learning platform, and attainment of real-world objectives. For instance, Willoughby may be presented with an award for converting 100 leads, completing all of the advanced training relating to sales in the learning platform, and showing up on time for more than 99% of his customer meetings. Since achievement of this award requires the utmost expertise in the sales field, Elinor can assign the skill "sales master" to the award, indicating that anyone who receives the award is a master of sales. As such, Willoughby's profile may indicate that he is a "sales master". Such an indication makes it clear to the higher-ups at Cents and Sensibility that they may assign difficult sales to Willoughby. Additionally, when Willoughby applies for a promotion, individuals making the hiring decision can verify his skills by viewing his profile.

While many examples relating to learning content are discussed herein, one having skill in the art can appreciate that the disclosed techniques do not necessarily need to be tied to a learning platform. For example, in some embodiments, the disclosed techniques may be used to provide awards for the performance of real-world activities (e.g., attending a particular event) and/or the completion of tasks in an application or service (e.g., converting leads in a CRM platform) without any connection to a learning platform. Similarly, in some implementations, customizable awards may be created using the disclosed techniques to award achievements in a learning platform without any direct connection to an application or service. Also or alternatively, the skill-tracking techniques discussed below may be implemented separately from any type of learning platform.

Figure 2:
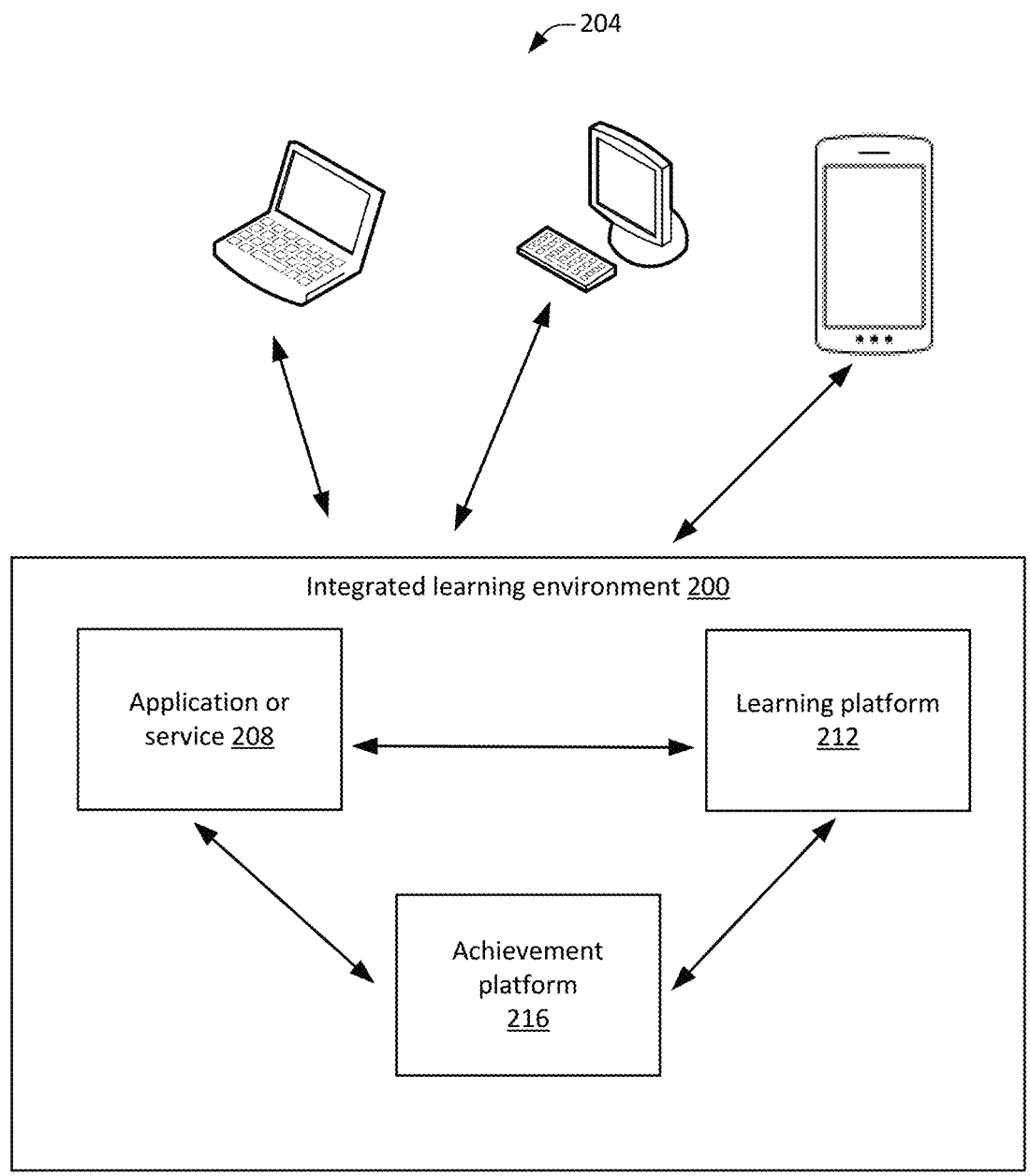
FIG. 2 shows a block diagram of an example of a system for implementing an achievement platform using a database system, in accordance with some implementations.
Figure 4:
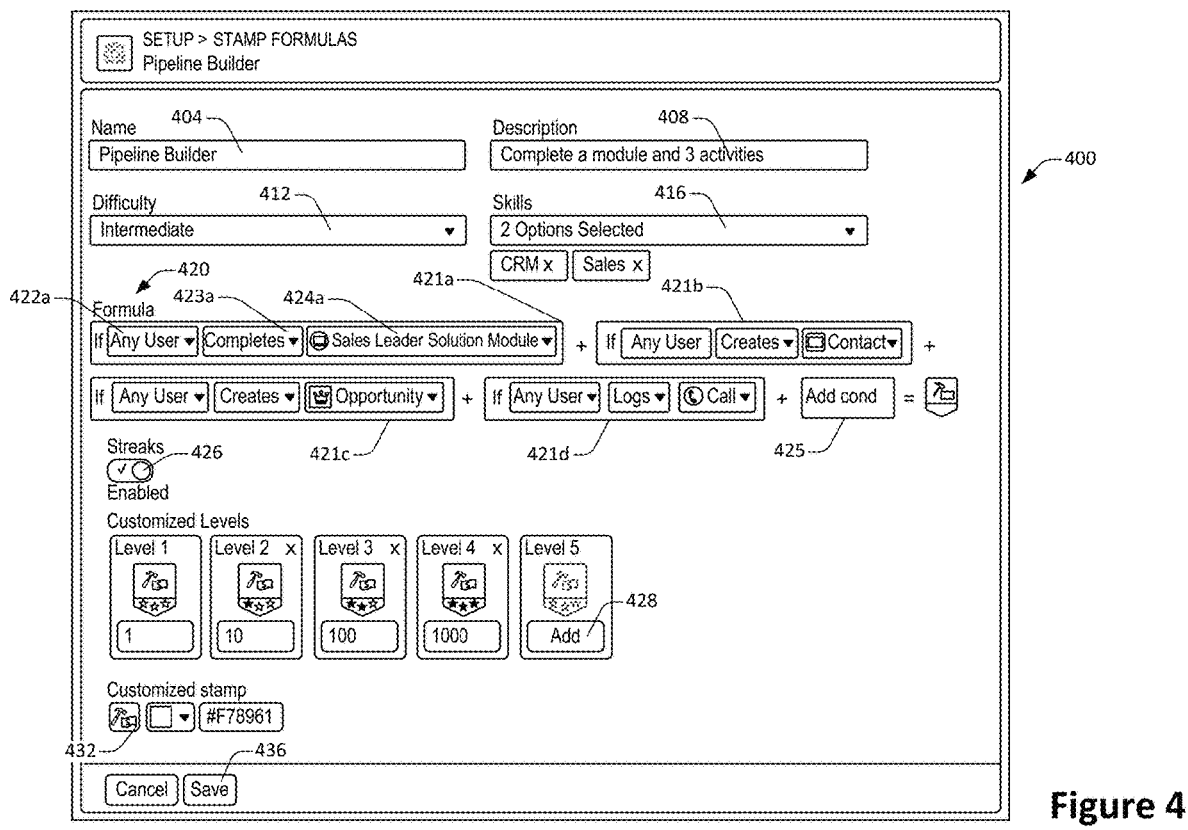
Figure 5:
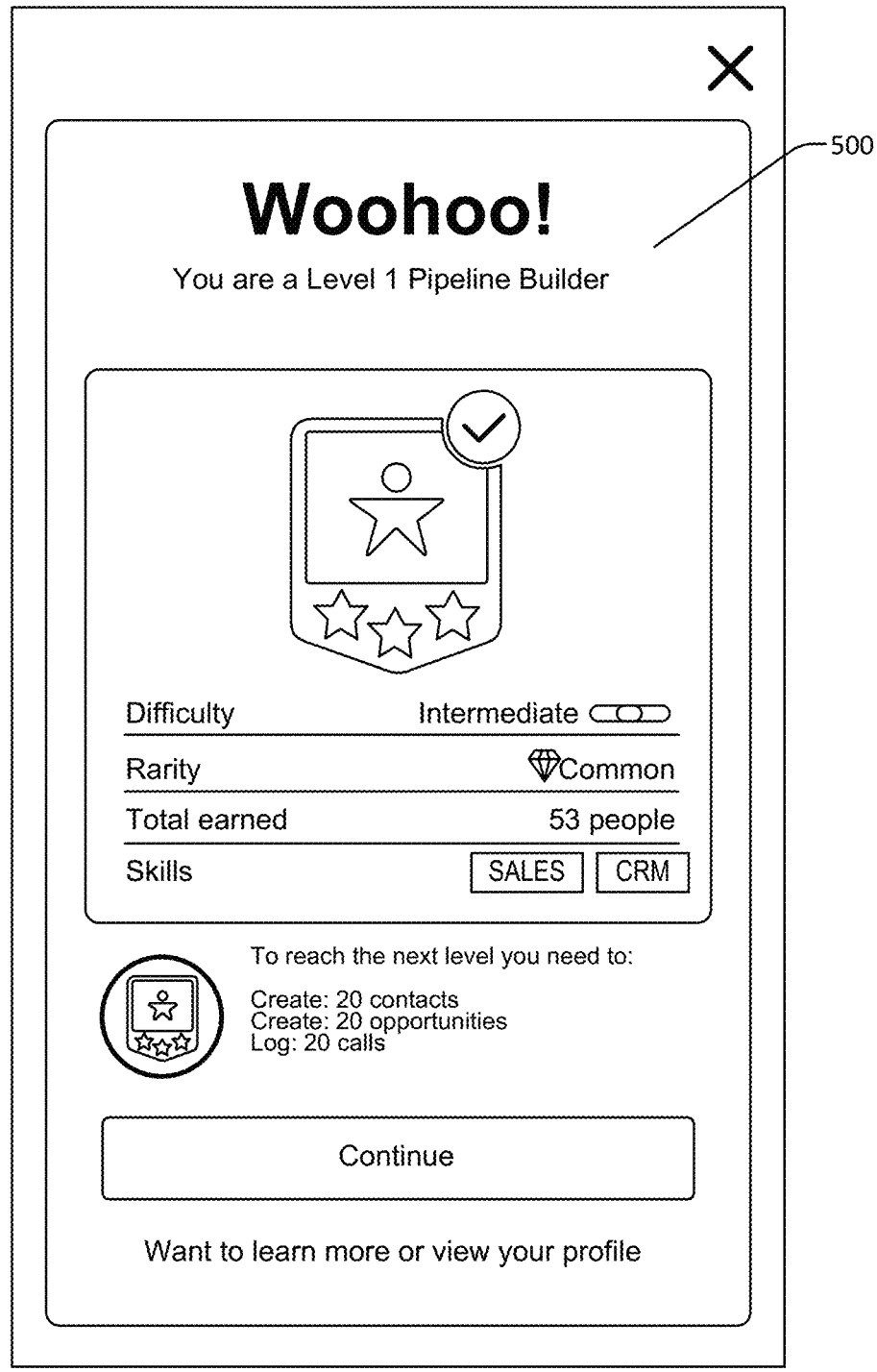
Figure 6:
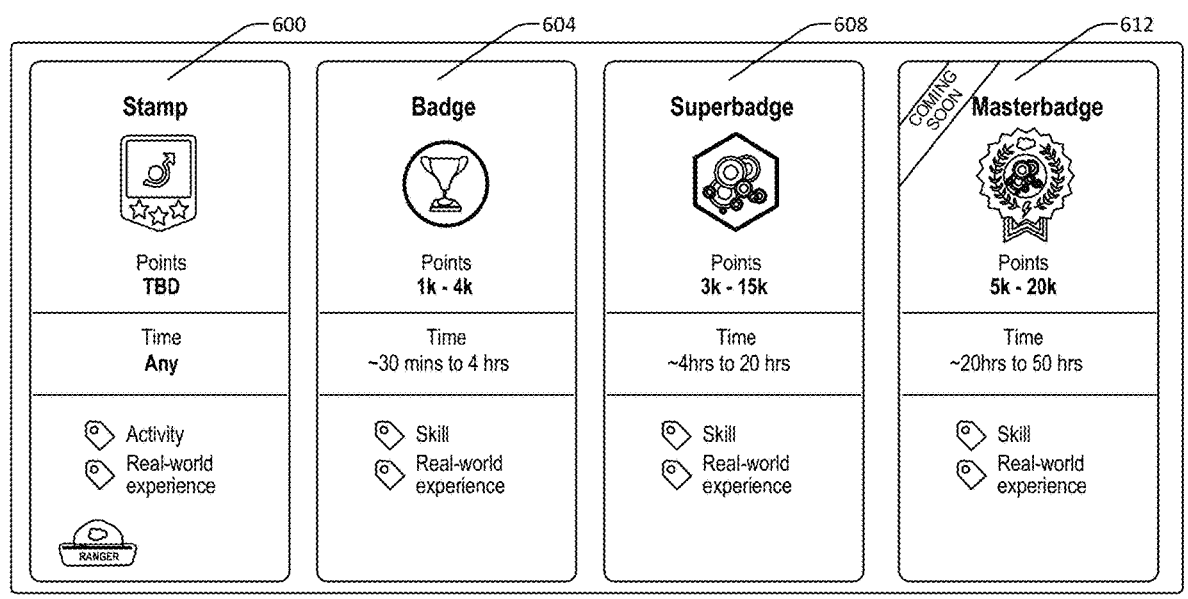
Figure 7:
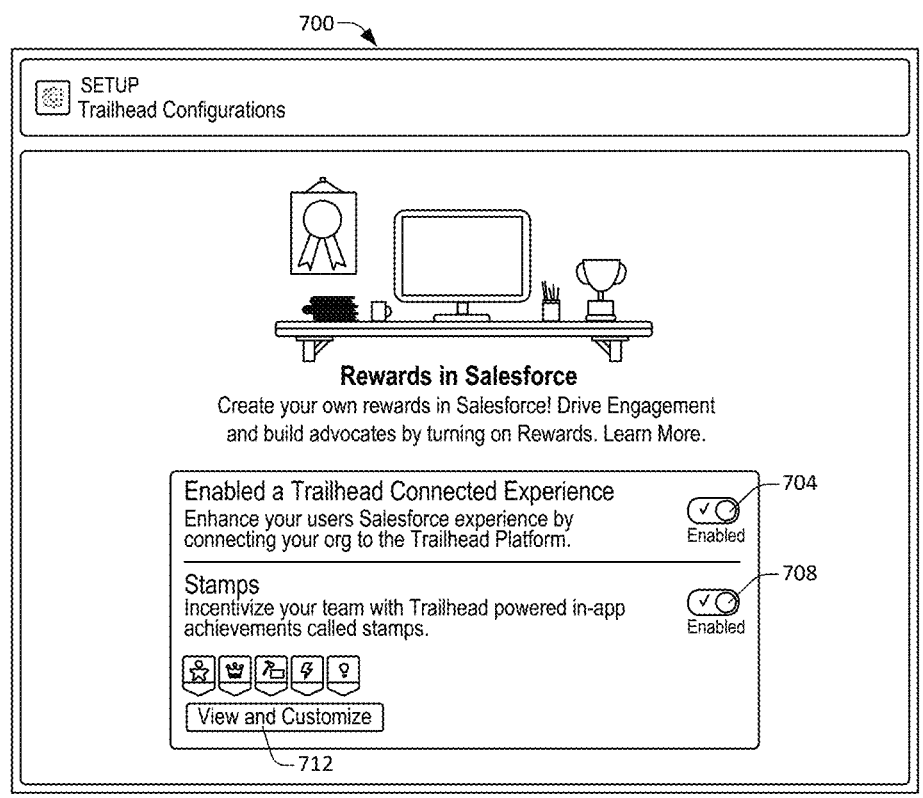

FIG. 1 shows a flowchart of an example of a method for implementing an achievement platform using a database system, performed in accordance with some implementations. FIG. 2 shows a block diagram of an example of a system for implementing an achievement platform using a database system, in accordance with some implementations. FIGS. 3-8 show examples of Graphical User Interfaces (GUIs), in accordance with some implementations.

At 104 of FIG. 1, an achievement platform is maintained. As described above, the achievement platform may be maintained in association with a learning platform and/or an application or service. The achievement platform may be configurable to provide awards (e.g., stamps, badges, super-badges, master-badges, etc.) to users of the application or service for achievements in the learning platform, the application or service, real-world achievements separate from the application or service and the learning platform, and/or a combination of these types of achievements. By way of example, in FIG. 2, user devices 204 interact with integrated learning environment 200. Integrated learning environment 200 may include a variety of components such as application or service 208, learning platform 212, and achievement platform 216. Users of the user devices 204 learn by interacting with application or service 208 and learning platform 212, and are presented with awards for achievements in the application or service 208 and learning platform 212 via the achievement platform 216. By way of example, as discussed below, the achievement platform 216 may include a user interface by which an authorized administrator using one of the user devices 204 may create and/or customize awards. The achievement platform 216 may process users' interactions with the application or service 208 and learning platform 212, presenting users with awards as such users satisfy conditions of awards, as discussed further below.

The application or service 208, the learning platform 212, and/or the achievement platform 216 may be provided to the user devices 204 in a variety of manners, e.g., via an on-demand computing environment, as discussed further below in the context of FIGS. 9-11. By way of example, application servers 950(1)-(N) of FIG. 9 may perform functions relating to implementation of CRM platform as well as functions relating to the provision of awards.

Returning to FIG. 1, at 108, a user interface is displayed on a device of an authorized user, such as an administrator, of the achievement platform. As discussed above, the authorized user may be affiliated with a tenant organization implementing the application or service in an on-demand computing environment. By way of example, Elinor may navigate to stamp management screen 300 of FIG. 3. Stamp management screen 300 includes a list of stamps 304(a)-(e) that are available to users affiliated with the Cents and Sensibility organization. In order to create a new customized award, Elinor may click or tap new button 308, causing user interface 400 of FIG. 4 to be displayed on Elinor's computing device.

In some implementations, a user interface, such as user interface 400, may provide graphical options for an authorized user to create, modify, and customize awards. For instance, user interface 400 includes a variety of fields and selections, which allow users to create, modify, and customize awards. By way of example, Elinor wishes to create the "Pipeline Builder" stamp, which is a type of customizable award. Elinor may type "Pipeline Builder," the name of the customizable award she wishes to create, in name field 404. Elinor may then type a description of the Pipeline Builder stamp in description field 408. Elinor may select a difficulty for the Pipeline Builder stamp in difficulty menu 412. For example, Elinor has selected "intermediate" in the difficulty menu 412 because she estimates that achievement of the Pipeline Builder stamp may require an intermediate amount of work. On the other hand, for other awards, Elinor may select different corresponding difficulties. By way of illustration, Elinor may select "easy" for awards which she estimates will take less than an hour to achieve, "difficult" for awards that will take more than 50 hours to achieve, "very difficult" for awards that will take more than 100 hours to achieve, and so on and so forth.

In some implementations, awards may be achievable based on customizable logic definable by an authorized user via a user interface, such as user interface 400. By way of illustration, Elinor may define customizable logic of the Pipeline Builder stamp by defining conditions that must be satisfied in order for a user to achieve the Pipeline Builder stamp. Elinor may define such conditions in "formula menu" 420. When defining a condition, an authorized user may designate particular users or groups of users who may satisfy the condition. By way of illustration, Elinor has designated any user as being eligible to satisfy condition 421a by selecting "any user" in user designation menu 422a. In another example, Elinor may wish to create a "Sales Master"

award that is only available to salespeople; therefore, she may designate salespeople as being eligible to satisfy conditions of the Sales Master by selecting "salespeople" in a user designation menu.

When defining a condition, an authorized user may designate a particular action and object such that performance of the particular action on the particular object is required for satisfying a condition. By way of illustration, returning to the example of the Pipeline Builder stamp, Elinor has designated the action of "completing" the object of the "Sales Leader Solution Module" as being required for satisfying condition 421a of FIG. 4. Elinor may designate the action for condition 421a by selecting "completes" in action selection menu 423a. Similarly, Elinor may designate the object of the Sales Leader Solution Module for condition 421a by selecting "Sales Leader Solution Module" in object selection menu 423a. Using the above described techniques, Elinor may define the remaining conditions that must be satisfied in order for a user to achieve the Pipeline Builder stamp, e.g., any user creating a contact (condition 421b), any user creating an opportunity (condition 421c), and any user logging a call (condition 421d).

While several examples of action and object combinations are described above, one having skill in the art can appreciate that a condition of an award may include any combination of actions and objects. For example, as discussed above, conditions for achievement of customizable awards may include any combination of conduct in the learning platform, conduct in the application or service, and/or real-world conduct separate from the learning platform and the application or service. By way of illustration, conditions for a particular award may include following up on 100 leads, completing a certain module or course in the learning platform, and attending a particular conference such as Dreamforce®.

Achievement of an award may require satisfaction of any number of conditions. By way of example, achievement of the Pipeline Builder stamp requires achievement of four conditions, e.g., conditions 421a-d of FIG. 4. If Catherine wishes to add further conditions to the Pipeline Builder stamp, she may click or tap add conditions button 425 of FIG. 4.

Also or alternatively, an authorized user may select to enable "streaks" to provide bonuses in association with consecutive achievement of awards in a particular time period. By way of example, Elinor may enable streaks for the Pipeline Builder stamp using "streaks switch" 426 of FIG. 4. When streaks are enabled, a user may receive some kind of bonus such as a notification, another award, or even monetary compensation for consecutive achievement of streak-enabled awards in particular time intervals. For instance, Lockwood may receive a congratulatory notification for achieving a streak-enabled award every day for five days in a row.

In some implementations, a customizable award may have a variety of "levels." Each level of a customizable award may be achievable by completion of a greater number of and/or more advanced tasks than the previous level. Such levels may be customized and defined via a user interface of the achievement platform. By way of example, the Pipeline Builder stamp has 4 levels. Elinor may add a fifth level to the Pipeline Builder stamp by clicking or tapping "add button" 428 of FIG. 4. Elinor may define conditions for achievement of each level of an award via a user interface such as user interface 400. By way of example, Elinor may define the conditions for achievement of level two of the Pipeline Builder stamp as requiring the creation of 20 contacts and 20 opportunities as well as the logging of 20 calls.

Also or alternatively, a user interface for defining or modifying an award may include a variety of menus, selections, fields, and other graphical elements configurable to allow an authorized user to customize a variety of other attributes of an award. By way of example, Elinor may select the color of the Pipeline Builder stamp using color menu 432 of FIG. 4.

In some implementations, the disclosed techniques can be used for automated skill tracking and verification. By way of illustration, Elinor can optionally "assign" skill(s) to awards such that the skills can be corroborated by achievement of awards. Elinor may select such skills via skills selection menu 416. By way of example, Elinor has selected to assign the skills of "CRM" and "Sales" to the pipeline builder stamp. As such, when a user is awarded with the pipeline builder stamp, a database system can store information indicating that the user has the CRM and Sales skills. Accordingly, such skill data can be used for tracking and verification purposes. By way of illustration, Willoughby may be going up for promotion to head salesperson. The head salesperson position may require the Sales and CRM skills. Willoughby has received the Pipeline Builder stamp and, therefore, data indicating that Willoughby has the CRM and Sales skills has been stored, as described above. Thus, it can be automatically verified that Willoughby possesses the necessary CRM and Sales skills for promotion to head salesperson. Also or alternatively, if someone leaves employment at a particular organization and becomes an employee of a new organization, records of his or her skills can be stored and made available to the new organization. As such, he or she may avoid redundant training when he or she begins employment at the new organization.

At 112 of FIG. 1 the authorized user enters input to create an award. By way of example, after entering values into the fields, menus, selections, and other elements of user interface 400 to define the Pipeline Builder stamp, as described above, Elinor may click or tap save button 436 to create the Pipeline Builder stamp.

At 116 of FIG. 1, data associated with the award is stored in a database system. By way of example, in response to processing Elinor's input at 112, data associated with the Pipeline Builder stamp may be stored in a database system (e.g., tenant data 923 of FIG. 9) such that the Pipeline Builder stamp is achievable by users affiliated with the Cents and Sensibility organization when such users satisfy the conditions of the Pipeline Builder stamp.

At 120 of FIG. 1, it is determined that a user of the application or service has satisfied the conditions of an award. By way of illustration, as described above, when a user affiliated with the Cents and Sensibility organization completes the "Sales Leader Solution Module," creates a contact, creates an opportunity, and logs a call, he or she may be presented with the Pipeline Builder stamp. As such, once Willoughby completes the "Sales Leader Solution Module," creates a contact, creates an opportunity, and logs a call, a database system implementing the CRM platform may determine that Willoughby has completed the "Sales Leader Solution Module," created a contact, created an opportunity, and logged a call. Data indicating that Willoughby has completed these tasks may be processed by the database system, and it can be determined that Willoughby has satisfied the conditions of the Pipeline Builder stamp.

In some implementations, at 124 of FIG. 1, a user is caused to be presented with an award. Returning to the example of the preceding paragraph, Willoughby may be presented with Pipeline Builder stamp 500 of FIG. 5 in response to the determination at 120 of FIG. 1 that he has satisfied all of the conditions for achievement of the Pipeline Builder stamp.

In some implementations, the award presented at 124 of FIG. 1 may be one of a variety of types of available awards. Various types of award may be achievable by specific conduct in the learning platform, the application or service, or real-world activity. By way of example, stamp 600 of FIG. 6 may be earned by completing tasks in the application or service but stamp 600 may not be earned through completion of tasks in the learning platform. Badge 604 may be earned by completing intermediate tasks in the learning platform. Super badge 608 may be earned by completing difficult tasks in the learning platform. Master badge 612 may be earned by completing very difficult tasks in the learning platform. Since stamp 600 is only achievable through conduct in the application or service, and badge 604, super badge 608, and master badge 612 are only achievable through the learning platform, users may be incentivized to learn using both the learning platform and the application or service in order to achieve all available types of awards.

Also or alternatively, awards may each have an individual point value. As such, a user's total point value may be displayed as he or she interacts with the application or service. By way of illustration, Elinor has received 54 awards for a variety of conduct in the learning platform, the CRM platform, and other real-world conduct. Elinor's 54 awards are worth a total of 18,000 points. As such, in FIG. 8, awards section 808 of Elinor's profile page indicates that she has earned 18,000 points.

In some implementations, at 128 of FIG. 1, data indicating that a user has particular skills may be stored in a database system. By way of example, in response to determining that Willoughby has satisfied the conditions of the Pipeline Builder stamp, data indicating that Willoughby has the CRM and Sales skills (the skills assigned to the Pipeline Builder stamp) may be stored in a database system such as database system 916 of FIG. 9. As discussed above, such data can be used for a variety of purposes such as skill tracking and verification.

In some implementations, at 132 of FIG. 1, a request from an authorized administrator to disable achievement of awards is processed. By way of example, employees of Cents and Sensibility may become too competitive in achieving awards, creating hostility in the office. As such, Elinor, as an authorized administrator, may want to disable the ability for Cents and Sensibility employees to achieve awards in the CRM platform. To do so, Elinor may access a settings menu in the CRM platform, causing her to be presented with user interface 700. Elinor may request to disable awards in the CRM platform for all users in the Cents and Sensibility organization by clicking or tapping switch 708.

User interface 700 includes several other elements with which an authorized administrator may interact. By way of example, Elinor may navigate to a user interface for viewing and customizing awards using the techniques described above by clicking or tapping button 712. Also or alternatively, Elinor may enable or disable sharing of information between the application or service and the learning platform by clicking or tapping switch 704.

In some implementations, at 136 of FIG. 1, achievement of awards is disabled for users affiliated with an organization. By way of illustration, returning to the example of the preceding paragraph, achievement of awards in the CRM platform for all users in the Cents and Sensibility organization may be disabled in response to Elinor's request.

Figure 8:
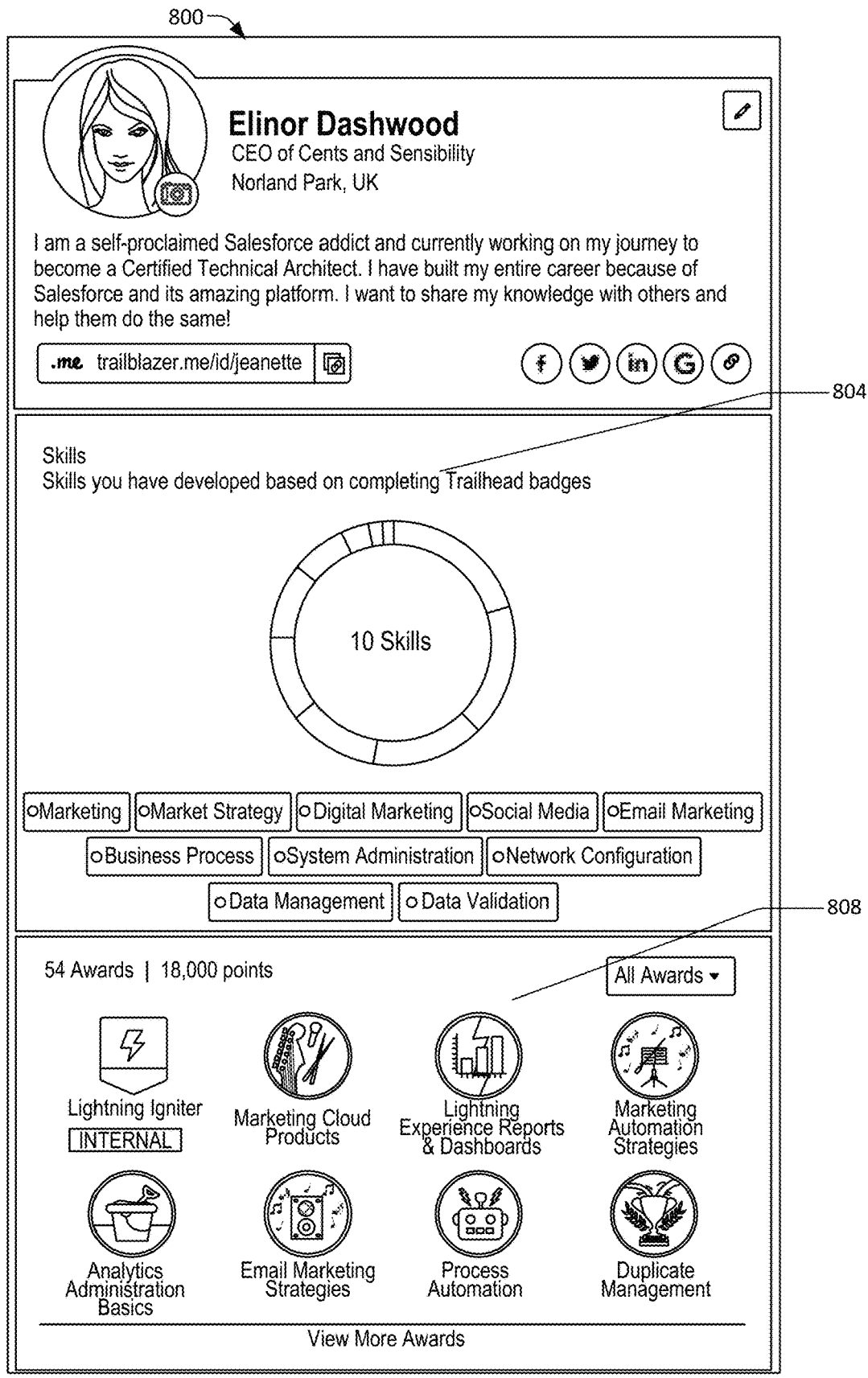

In some implementations awards and/or skills may be displayed in association with a user's profile, e.g., her profile in a social or professional networking system such as Chatter®, LinkedIn®, Facebook®, etc. By way of example, FIG. 8 depicts Elinor's profile 800. Elinor's profile 800 includes a skills section 804 and an awards section 808. Her awards section 808 includes any awards that she has received. Similarly, skills section 804 includes any skills that have been verified using the above-described techniques. Such profile information may be optionally provided to third parties. By way of example, Elinor may choose to share her skill and award information with LinkedIn®.

Figure 9:
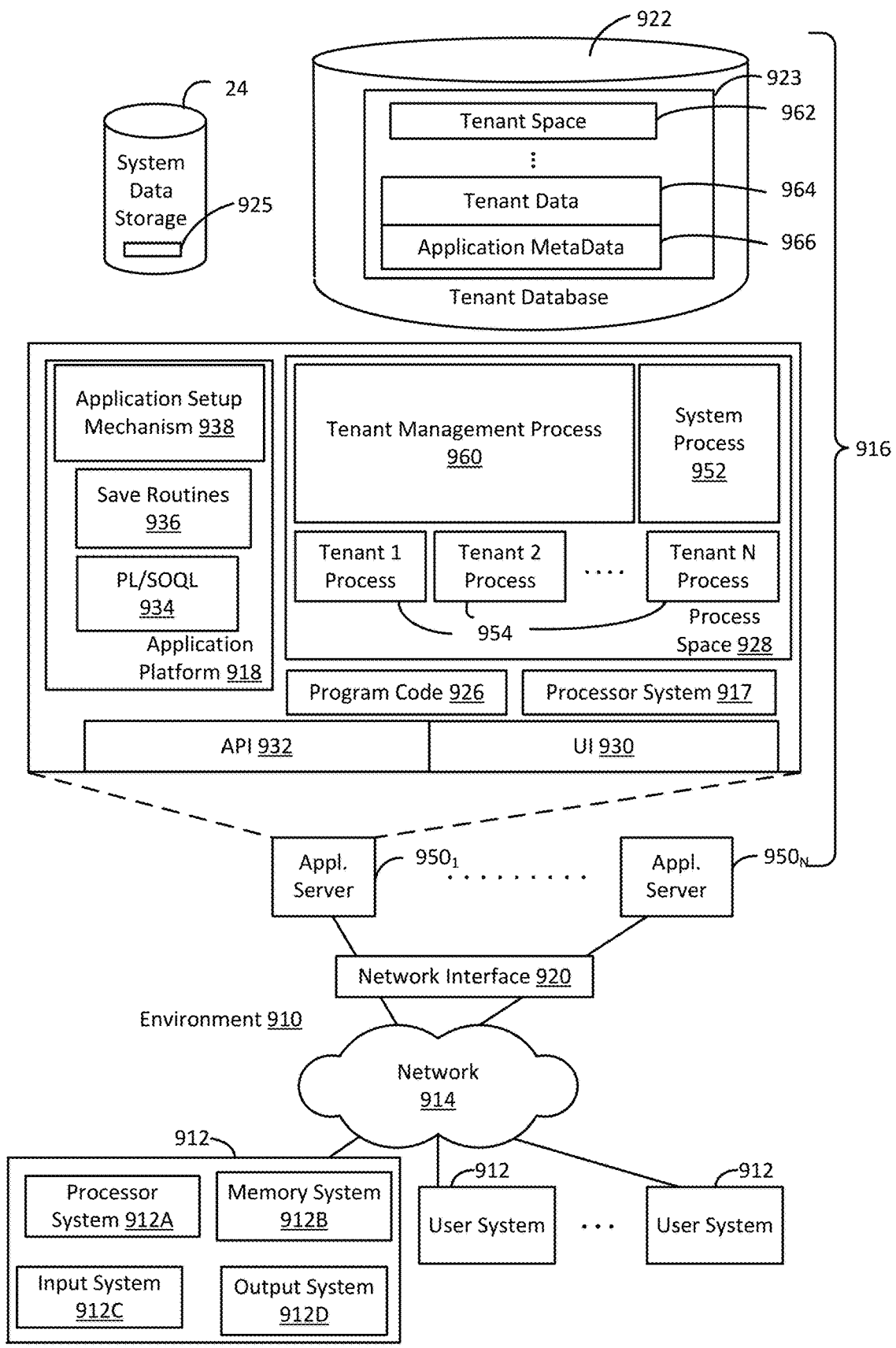
FIG. 9 shows a block diagram of an example of an environment that includes an on-demand database service configured in accordance with some implementations.

FIG. 9 shows a block diagram of an example of an environment 910 that includes an on-demand database service configured in accordance with some implementations. Environment 910 may include user systems 912, network 914, database system 916, processor system 917, application platform 918, network interface 920, tenant data storage 922, tenant data 923, system data storage 924, system data 925, program code 926, process space 928, User Interface (UI) 930, Application Program Interface (API) 932, PL/SOQL 934, save routines 936, application setup mechanism 938, application servers 950-1 through 950-N, system process space 952, tenant process spaces 954, tenant management process space 960, tenant storage space 962, user storage 964, and application metadata 966. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 916, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 916. Such applications may be developed by the database service provider or by users or third-party application developers accessing the service. Application platform 918 includes an application setup mechanism 938 that supports application developers' creation and management of applications, which may be saved as metadata into tenant data storage 922 by save routines 936 for execution by subscribers as one or more tenant process spaces 954 managed by tenant management process 960 for example. Invocations to such applications may be coded using PL/SOQL 934 that provides a programming language style interface extension to API 932. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 966 for a subscriber making such an invocation. Such system processes may also manage execution of application metadata 966 as an application in a virtual machine.

In some implementations, each application server 950 may handle requests for any user associated with any organization. A load balancing function (e.g., an F5 Big-IP load balancer) may distribute requests to the application servers 950 based on an algorithm such as least-connections, round robin, observed response time, etc. Each application server 950 may be configured to communicate with tenant data storage 922 and the tenant data 923 therein, and system data storage 924 and the system data 925 therein to serve requests of user systems 912. The tenant data 923 may be divided into individual tenant storage spaces 962, which can be either a physical arrangement and/or a logical arrangement of data. Within each tenant storage space 962, user storage 964 and application metadata 966 may be similarly allocated for each user. For example, a copy of a user's most recently used (MRU) items might be stored to user storage 964. Similarly, a copy of MRU items for an entire tenant organization may be stored to tenant storage space 962. A UI 930 provides a user interface and an API 932 provides an application programming interface to system 916 resident processes to users and/or developers at user systems 912.

System 916 may implement an integrated learning environment including a variety of components such as a web-based application or service (e.g., a CRM system), a web-based learning platform, and/or a web-based achievement platform. For example, in some implementations, system 916 may include application servers configured to implement and execute a variety of software applications related to the above-described systems, applications, services, and/or platforms. The application servers may be configured to provide related data, code, forms, web pages and other information to and from user systems 912. Additionally, the application servers may be configured to store information to, and retrieve information from a database system. Such information may include related data, objects, and/or Webpage content. With a multi-tenant system, data for multiple tenants may be stored in the same physical database object in tenant data storage 922, however, tenant data may be arranged in the storage medium(s) of tenant data storage 922 so that data of one tenant is kept logically separate from that of other tenants. In such a scheme, one tenant may not access another tenant's data, unless such data is expressly shared.

Several elements in the system shown in FIG. 9 include conventional, well-known elements that are explained only briefly here. For example, user system 912 may include processor system 912A, memory system 912B, input system 912C, and output system 912D. A user system 912 may be implemented as any computing device(s) or other data processing apparatus such as a mobile phone, laptop computer, tablet, desktop computer, or network of computing devices. User system 12 may run an Internet browser allowing a user (e.g., a subscriber of an MTS) of user system 912 to access, process and view information, pages and applications available from system 916 over network 914. Network 914 may be any network or combination of networks of devices that communicate with one another, such as any one or any combination of a LAN (local area network), WAN (wide area network), wireless network, or other appropriate configuration.

The users of user systems 912 may differ in their respective capacities, and the capacity of a particular user system 912 to access information may be determined at least in part by "permissions" of the particular user system 912. As discussed herein, permissions generally govern access to computing resources such as data objects, components, and other entities of a computing system, such as a learning platform, an achievement platform, and/or any application or service such as a social networking system and/or a CRM database system. "Permission sets" generally refer to groups of permissions that may be assigned to users of such a computing environment. For instance, the assignments of users and permission sets may be stored in one or more databases of System 916. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 916 may provide on-demand database service to user systems 912 using an MTS arrangement. By way of example, one tenant organization may be a company that employs a sales force where each salesperson uses system 916 to manage their sales process. Thus, a user in such an organization may maintain contact data, leads data, customer follow-up data, performance data, goals and progress data, etc., all applicable to that user's personal sales process (e.g., in tenant data storage 922). In this arrangement, a user may manage his or her sales efforts and cycles from a variety of devices, since relevant data and applications to interact with (e.g., access, view, modify, report, transmit, calculate, etc.) such data may be maintained and accessed by any user system 912 having network access.

When implemented in an MTS arrangement, system 916 may separate and share data between users and at the organization-level in a variety of manners. For example, for certain types of data each user's data might be separate from other users' data regardless of the organization employing such users. Other data may be organization-wide data, which is shared or accessible by several users or potentially all users from a given tenant organization. Thus, some data structures managed by system 916 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 916 may also maintain system-level data usable by multiple tenants or other data. Such system-level data may include industry reports, news, postings, and the like that are sharable between tenant organizations.

In some implementations, user systems 912 may be client systems communicating with application servers 950 to request and update system-level and tenant-level data from system 916. By way of example, user systems 912 may send one or more queries requesting data of a database maintained in tenant data storage 922 and/or system data storage 924. An application server 950 of system 916 may automatically generate one or more SQL statements (e.g., one or more SQL queries) that are designed to access the requested data. System data storage 924 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 10A:
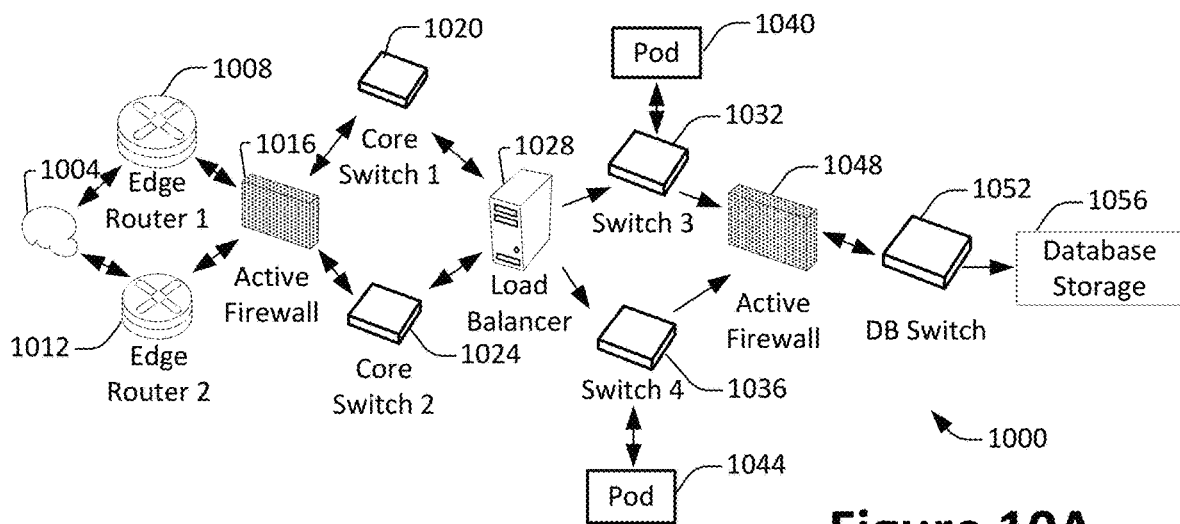
FIG. 10A shows a system diagram of an example of architectural components of an on-demand database service environment, configured in accordance with some implementations.

FIG. 10A shows a system diagram of an example of architectural components of an on-demand database service environment 1000, configured in accordance with some implementations. A client machine located in the cloud 1004 may communicate with the on-demand database service environment via one or more edge routers 1008 and 1012. A client machine may include any of the examples of user systems 912 described above. The edge routers 1008 and 1012 may communicate with one or more core switches 1020 and 1024 via firewall 1016. The core switches may communicate with a load balancer 1028, which may distribute server load over different pods, such as the pods 1040 and 1044 by communication via pod switches 1032 and 1036. The pods 1040 and 1044, which may each include one or more servers and/or other computing resources, may perform data processing and other operations used to provide on-demand services. Components of the environment may communicate with a database storage 1056 via a database firewall 1048 and a database switch 1052.

Accessing an on-demand database service environment may involve communications transmitted among a variety of different components. The environment 1000 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 10A and 10B.

The cloud 1004 refers to any suitable data network or combination of data networks, which may include the Internet. Client machines located in the cloud 1004 may communicate with the on-demand database service environment 1000 to access services provided by the on-demand database service environment 1000. By way of example, client machines may access the on-demand database service environment 1000 to retrieve, store, edit, and/or process information from a learning platform, and application or service, and/or an achievement platform.

In some implementations, the edge routers 1008 and 1012 route packets between the cloud 1004 and other components of the on-demand database service environment 1000. The edge routers 1008 and 1012 may employ the Border Gateway Protocol (BGP). The edge routers 1008 and 1012 may maintain a table of IP networks or 'prefixes', which designate network reachability among autonomous systems on the Internet.

In one or more implementations, the firewall 1016 may protect the inner components of the environment 1000 from Internet traffic. The firewall 1016 may block, permit, or deny access to the inner components of the on-demand database service environment 1000 based upon a set of rules and/or other criteria. The firewall 1016 may act as one or more of a packet filter, an application gateway, a stateful filter, a proxy server, or any other type of firewall.

In some implementations, the core switches 1020 and 1024 may be high-capacity switches that transfer packets within the environment 1000. The core switches 1020 and 1024 may be configured as network bridges that quickly route data between different components within the on-demand database service environment. The use of two or more core switches 1020 and 1024 may provide redundancy and/or reduced latency.

In some implementations, communication between the pods 1040 and 1044 may be conducted via the pod switches 1032 and 1036. The pod switches 1032 and 1036 may facilitate communication between the pods 1040 and 1044 and client machines, for example via core switches 1020 and 1024. Also or alternatively, the pod switches 1032 and 1036 may facilitate communication between the pods 1040 and 1044 and the database storage 1056. The load balancer 1028 may distribute workload between the pods, which may assist in improving the use of resources, increasing throughput, reducing response times, and/or reducing overhead. The load balancer 1028 may include multilayer switches to analyze and forward traffic.

In some implementations, access to the database storage 1056 may be guarded by a database firewall 1048, which may act as a computer application firewall operating at the database application layer of a protocol stack. The database firewall 1048 may protect the database storage 1056 from application attacks such as structure query language (SQL) injection, database rootkits, and unauthorized information disclosure. The database firewall 1048 may include a host using one or more forms of reverse proxy services to proxy traffic before passing it to a gateway router and/or may inspect the contents of database traffic and block certain content or database requests. The database firewall 1048 may work on the SQL application level atop the TCP/IP stack, managing applications' connection to the database or SQL management interfaces as well as intercepting and enforcing packets traveling to or from a database network or application interface.

In some implementations, the database storage 1056 may be an on-demand database system shared by many different organizations. The on-demand database service may employ a single-tenant approach, a multi-tenant approach, a virtualized approach, or any other type of database approach. Communication with the database storage 1056 may be conducted via the database switch 1052. The database storage 1056 may include various software components for handling database queries. Accordingly, the database switch 1052 may direct database queries transmitted by other components of the environment (e.g., the pods 1040 and 1044) to the correct components within the database storage 1056.

Figure 10B:
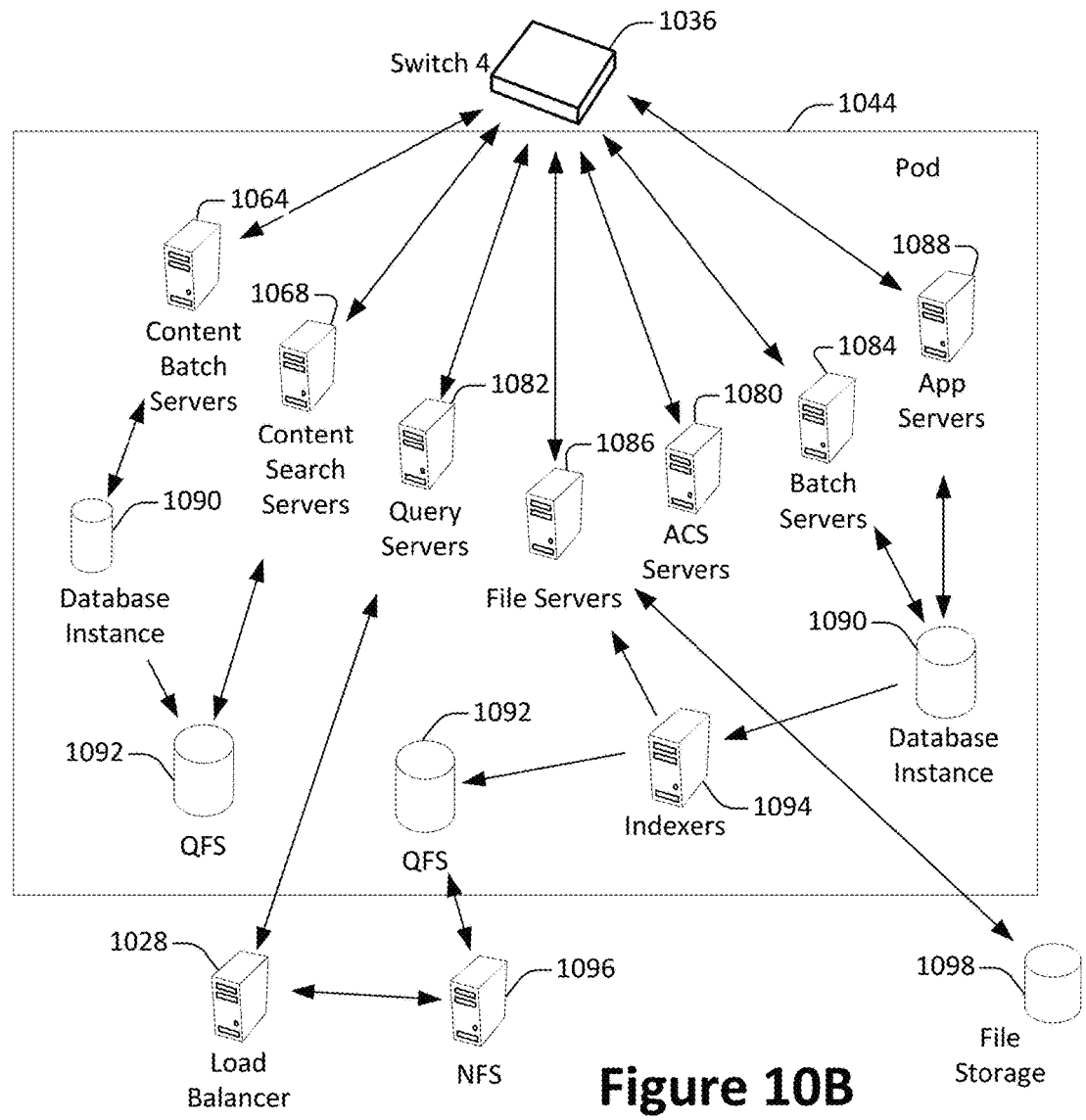
FIG. 10B shows a system diagram further illustrating an example of architectural components of an on-demand database service environment, in accordance with some implementations.

FIG. 10B shows a system diagram further illustrating an example of architectural components of an on-demand database service environment, in accordance with some implementations. The pod 1044 may be used to render services to user(s) of the on-demand database service environment 1000. The pod 1044 may include one or more content batch servers 1064, content search servers 1068, query servers 1082, file servers 1086, access control system (ACS) servers 1080, batch servers 1084, and app servers 1088. Also, the pod 1044 may include database instances 1090, quick file systems (QFS) 1092, and indexers 1094. Some or all communication between the servers in the pod 1044 may be transmitted via the switch 1036.

In some implementations, the app servers 1088 may include a framework dedicated to the execution of procedures (e.g., programs, routines, scripts) for supporting the construction of applications provided by the on-demand database service environment 1000 via the pod 1044. One or more instances of the app server 1088 may be configured to execute all or a portion of the operations of the services described herein.

In some implementations, as discussed above, the pod 1044 may include one or more database instances 1090. A database instance 1090 may be configured as an MTS in which different organizations share access to the same database, using the techniques described above. Database information may be transmitted to the indexer 1094, which may provide an index of information available in the database 1090 to file servers 1086. The QFS 1092 or other suitable filesystem may serve as a rapid-access file system for storing and accessing information available within the pod 1044. The QFS 1092 may support volume management capabilities, allowing many disks to be grouped together into a file system. The QFS 1092 may communicate with the database instances 1090, content search servers 1068 and/or indexers 1094 to identify, retrieve, move, and/or update data stored in the network file systems (NFS) 1096 and/or other storage systems.

In some implementations, one or more query servers 1082 may communicate with the NFS 1096 to retrieve and/or update information stored outside of the pod 1044. The NFS 1096 may allow servers located in the pod 1044 to access information over a network in a manner similar to how local storage is accessed. Queries from the query servers 1022 may be transmitted to the NFS 1096 via the load balancer 1028, which may distribute resource requests over various resources available in the on-demand database service environment 1000. The NFS 1096 may also communicate with the QFS 1092 to update the information stored on the NFS 1096 and/or to provide information to the QFS 1092 for use by servers located within the pod 1044.

In some implementations, the content batch servers 1064 may handle requests internal to the pod 1044. These requests may be long-running and/or not tied to a particular customer, such as requests related to log mining, cleanup work, and maintenance tasks. The content search servers 1068 may provide query and indexer functions such as functions allowing users to search through content stored in the on-demand database service environment 1000. The file servers 1086 may manage requests for information stored in the file storage 1098, which may store information such as documents, images, basic large objects (BLOBs), etc. The query servers 1082 may be used to retrieve information from one or more file systems. For example, the query system 1082 may receive requests for information from the app servers 1088 and then transmit information queries to the NFS 1096 located outside the pod 1044. The ACS servers 1080 may control access to data, hardware resources, or software resources called upon to render services provided by the pod 1044. The batch servers 1084 may process batch jobs, which are used to run tasks at specified times. Thus, the batch servers 1084 may transmit instructions to other servers, such as the app servers 1088, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 11:
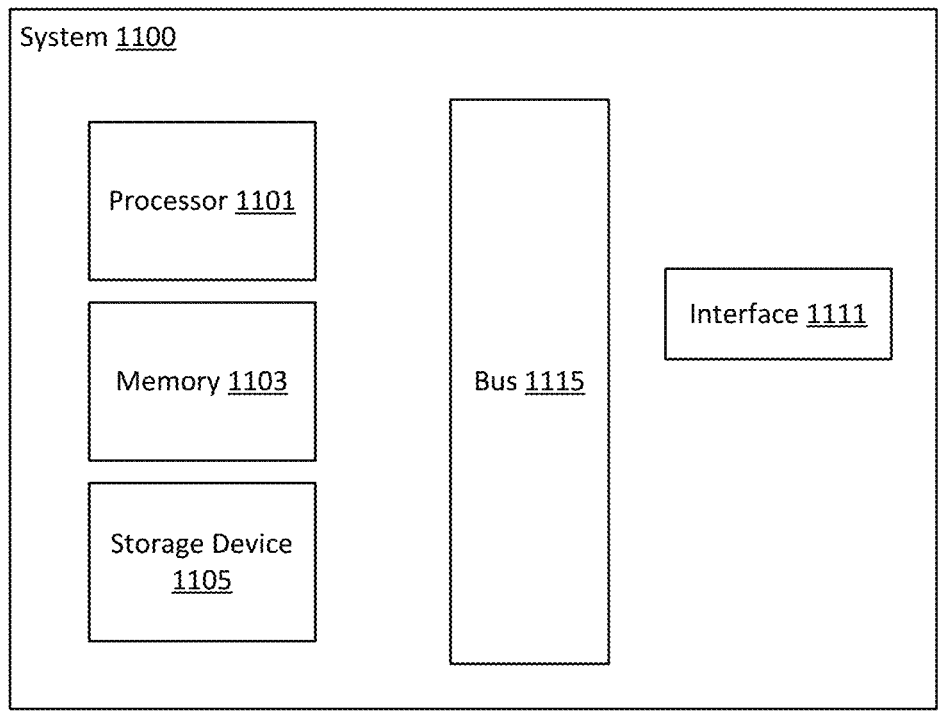
FIG. 11 illustrates one example of a computing device, configured in accordance with one or more embodiments.

FIG. 11 illustrates one example of a computing device. According to various embodiments, a system 1100 suitable for implementing embodiments described herein includes a processor 1101, a memory module 1103, a storage device 1105, an interface 1111, and a bus 1115 (e.g., a PCI bus or other interconnection fabric.) System 1100 may operate as variety of devices such as an application server, a database server, or any other device or service described herein. Although a particular configuration is described, a variety of alternative configurations are possible. The processor 1101 may perform operations such as those described herein. Instructions for performing such operations may be embodied in the memory 1103, on one or more non-transitory computer readable media, or on some other storage device. Various specially configured devices can also be used in place of or in addition to the processor 1101. The interface 1111 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of the present invention apply to a wide variety of computing environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A database system implemented using a server system comprising one or more hardware processors, the database system configured to cause:

maintaining, in association with a learning platform, an achievement platform, the achievement platform providing awards associated with the learning platform to users of an application or service for achievements associated with the application or service;

displaying, on a device of an authorized user of the achievement platform, a user interface operating to allow the authorized user to create or modify customizable awards and skills based on the application or service or the learning platform, the authorized user being affiliated with a first organization of a plurality of organizations implementing the application or service;

processing input, from the authorized user via the user interface, to create a first award based on first customizable logic and a skill that is assigned to the first award, the first customizable logic being configured by the authorized user such that satisfaction of conditions associated with designated users of the application or service causes the designated users to be presented with the first award;

storing, responsive to processing the input, data affiliated with the first award in a database system such that the first award is achievable by users associated with the first organization and data assigning the skill to the first award;

determining that a first user associated with the first organization has satisfied the conditions associated with the first award, wherein satisfied conditions of the award include:
  a first condition of a presence at a physical event by the first user;
  a second condition of a completion of a task by the first user regarding use of a feature in the application or service separate from the presence at the physical event; and
  a third condition of conduct associated with a training exercise on the learning platform other than the presence at the physical event and completion of the task;

presenting, responsive to determining that the first user has satisfied the conditions associated with the first award, the first user with the first award;

using the data stored for the skill that is assigned to the first award to store information indicating that the first user has the skill, wherein the skill describes an expertise; and providing a second organization from the plurality of organizations implementing the application or service with access to the information indicating that the first user has the skill, based on the first user becoming affiliated with the second organization.

2. The database system of claim 1, wherein the user interface comprises:
   a plurality of selections configured to allow the authorized user to customize a description and appearance of the first award, and
   a menu configured to allow the authorized user to specify the first customizable logic and designate actions and objects associated with the conditions.

3. The database system of claim 1, wherein the first award is a first type of a plurality of types of awards associated with the achievement platform, the first type of award being different from other types of awards achievable via performance of tasks in the learning platform.

4. The database system of claim 1, the database system further configured to cause:
   processing a request, from an authorized administrator, to disable achievement of awards in the application or service, the authorized administrator being associated with the first organization; and
   causing, responsive to processing the request, achievement of awards to be disabled for users associated with the first organization.

5. The database system of claim 1, wherein the application or service comprises a customer relationship management (CRM) platform provided to a plurality of tenant organizations via an on-demand computing environment, the first organization being one of the tenant organizations.

6. The database system of claim 1, wherein the skill is based on the feature in the application or service or the training exercise on the learning platform.

7. The database system of claim 1, wherein:
   the first award verifies the combination of the presence at the event, the completion of the task, and the conduct associated with the training exercise, and
   the first award being presented to the first user allows automatic verification that the first user possesses the skill.

8. A method comprising:
   maintaining, in association with a learning platform, an achievement platform, the achievement platform providing awards associated with the learning platform to users of an application or service for achievements associated with the application or service;
   causing display of, on a device of an authorized user of the achievement platform, a user interface operating to allow the authorized user to create or modify customizable awards and skills based on the application or service or the learning platform, the authorized user being affiliated with a first organization of a plurality of organizations implementing the application or service;
   processing input, from the authorized user via the user interface, to create a first award based on first customizable logic and a skill that is assigned to the first award, the first customizable logic being configured by the authorized user such that satisfaction of conditions associated with designated users of the application or service causes the designated users to be presented with the first award;
   storing, responsive to processing the input, data affiliated with the first award in a database system such that the first award is achievable by users associated with the first organization and data assigning the skill to the first award;
   determining that a first user associated with the first organization has satisfied the conditions associated with the first award, wherein satisfied conditions of the award include:
      a first condition of a presence at a physical event by the first user;
      a second condition of a completion of a task by the first user regarding use of a feature in the application or service separate from the presence at the physical event; and
      a third condition of conduct associated with a training exercise on the learning platform other than the presence at the physical event and completion of the task;
   presenting, responsive to determining that the first user has satisfied the conditions associated with the first award, the first user with the first award;
   using the data stored for the skill that is assigned to the first award to store information indicating that the first user has the skill, wherein the skill describes an expertise; and
   providing a second organization from the plurality of organizations implementing the application or service with access to the information indicating that the first user has the skill, based on the first user becoming affiliated with the second organization.

9. The method of claim 8, wherein the user interface comprises:
   a plurality of selections configured to allow the authorized user to customize a description and appearance of the first award, and
   a menu configured to allow the authorized user to specify the first customizable logic and designate actions and objects associated with the conditions.

10. The method of claim 8, wherein the first award is a first type of a plurality of types of awards associated with the achievement platform, the first type of award being different from other types of awards achievable via performance of tasks in the learning platform.

11. The method of claim 8, the method further comprising:
   processing a request, from an authorized administrator, to disable achievement of awards in the application or service, the authorized administrator being associated with the first organization; and
   causing, responsive to processing the request, achievement of awards to be disabled for users associated with the first organization.

12. The method of claim 8, wherein the application or service comprises a customer relationship management (CRM) platform provided to a plurality of tenant organizations via an on-demand computing environment, the first organization being one of the tenant organizations.

13. The method of claim 8, wherein the skill is based on the feature in the application or service or the training exercise on the learning platform.

14. The method of claim 8, wherein:
   the first award verifies the combination of the presence at the event, the completion of the task, and the conduct associated with the training exercise, and the first award being presented to the first user allows automatic verification that the first user possesses the skill.

15. A computer program product comprising a non-transitory computer-readable medium storing computer readable program code, the program code comprising instructions configured to cause:
   maintaining, in association with a learning platform, an achievement platform, the achievement platform providing awards associated with the learning platform to users of an application or service for achievements associated with the application or service;
   displaying, on a device of an authorized user of the achievement platform, a user interface operating to allow the authorized user to create or modify customizable awards and skills based on the application or service or the learning platform, the authorized user being affiliated with a first organization of a plurality of organizations implementing the application or service;
   processing input, from the authorized user via the user interface, to create a first award based on first customizable logic and a skill that is assigned to the first award, the first customizable logic being configured by the authorized user such that satisfaction of conditions associated with designated users of the application or service causes the designated users to be presented with the first award;
   storing, responsive to processing the input, data affiliated with the first award in a database system such that the first award is achievable by users associated with the first organization and data assigning the skill to the first award;
   determining that a first user associated with the first organization has satisfied the conditions associated with the first award, wherein satisfied conditions of the award include:
      a first condition of a presence at a physical event by the first user;
      a second condition of a completion of a task by the first user regarding use of a feature in the application or service separate from the presence at the physical event; and
      a third condition of conduct associated with a training exercise on the learning platform other than the presence at the physical event and completion of the task;
   presenting, responsive to determining that the first user has satisfied the conditions associated with the first award, the first user with the first award;
   using the data stored for the skill that is assigned to the first award to store information indicating that the first user has the skill, wherein the skill describes an expertise; and
   providing a second organization from the plurality of organizations implementing the application or service with access to the information indicating that the first user has the skill, based on the first user becoming affiliated with the second organization.

16. The computer program product of claim 15, wherein the user interface comprises:
   a plurality of selections configured to allow the authorized user to customize a description and appearance of the first award, and
   a menu configured to allow the authorized user to specify the first customizable logic and designate actions and objects associated with the conditions.

17. The computer program product of claim 15, wherein the first award is a first type of a plurality of types of awards associated with the achievement platform, the first type of award being different from other types of awards achievable via performance of tasks in the learning platform.

18. The computer program product of claim 15, the instructions further configured to cause:
   processing a request, from an authorized administrator, to disable achievement of awards in the application or service, the authorized administrator being associated with the first organization; and
   causing, processing the request, achievement of awards to be disabled for users associated with the first organization.

19. The computer program product of claim 15, wherein the skill is based on the feature in the application or service or the training exercise on the learning platform.

20. The computer program product of claim 15, wherein:
   the first award verifies the combination of the presence at the event, the completion of the task, and the conduct associated with the training exercise, and
   the first award being presented to the first user allows automatic verification that the first user possesses the skill.

* * * * *